United States Patent
Song et al.

(10) Patent No.: US 11,562,144 B2
(45) Date of Patent: Jan. 24, 2023

(54) GENERATIVE TEXT SUMMARIZATION SYSTEM AND METHOD

(71) Applicant: Robert Bosch GmbH, Stuttgart (DE)

(72) Inventors: Kaiqiang Song, Oviedo, FL (US); Bingqing Wang, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 16/819,655

(22) Filed: Mar. 16, 2020

(65) Prior Publication Data

US 2021/0286951 A1    Sep. 16, 2021

(51) Int. Cl.
| | |
|---|---|
| *G06F 40/30* | (2020.01) |
| *G06F 16/2457* | (2019.01) |
| *G06F 40/56* | (2020.01) |
| *G06N 3/08* | (2006.01) |
| *G06N 3/04* | (2006.01) |
| *G06Q 10/10* | (2012.01) |

(52) U.S. Cl.
CPC ........ *G06F 40/30* (2020.01); *G06F 16/24578* (2019.01); *G06F 40/56* (2020.01); *G06N 3/0454* (2013.01); *G06N 3/088* (2013.01); *G06Q 10/10* (2013.01)

(58) Field of Classification Search
CPC ..... G06F 40/30; G06F 16/24578; G06F 40/56
See application file for complete search history.

(56) References Cited

U.S. PATENT DOCUMENTS

| | | | |
|---|---|---|---|
| 6,334,132 B1* | 12/2001 | Weeks | G06F 16/345 707/723 |
| 7,292,972 B2* | 11/2007 | Lin | G06F 40/20 704/9 |
| 11,127,082 B1* | 9/2021 | Gore | G06Q 40/08 |
| 2007/0061356 A1* | 3/2007 | Zhang | G06F 16/345 707/999.102 |
| 2015/0142567 A1* | 5/2015 | Neelakant | G06Q 30/0256 705/14.54 |
| 2017/0161372 A1* | 6/2017 | Fernández | G06F 40/211 |
| 2017/0235888 A1* | 8/2017 | Rahman | G06F 40/211 705/3 |
| 2018/0032609 A1* | 2/2018 | Allen | G06F 16/3326 |
| 2018/0039644 A1* | 2/2018 | Bonanni | G06F 16/958 |
| 2018/0075139 A1* | 3/2018 | Sadovsky | G06N 20/20 |

(Continued)

OTHER PUBLICATIONS

Vaswani et al., "Attention Is All You Need", 31st Conference on Neural Information Processing Systems (NIPS 2017), Long Beach, CA, USA, 15 pages.

(Continued)

*Primary Examiner* — Kevin Ky
(74) *Attorney, Agent, or Firm* — Brooks Kushman P.C.

(57) ABSTRACT

A generative automatic text summarization system and method is disclosed that may adopt a search and reranking strategy to improve the performance of a summarization task. The system and method may employ a transformer neural model to assist with the summarization task. The transformer neural model may be trained to learn human abstracts and may then be operable to generate abstractive summaries. With multiple summary hypothesis generated, a best-first search algorithm and reranking algorithm may be employed to select the best candidate summary as part of the output summary.

20 Claims, 3 Drawing Sheets

(56) References Cited

U.S. PATENT DOCUMENTS

| | | | |
|---|---|---|---|
| 2018/0218079 A1* | 8/2018 | Li | G06F 16/335 |
| 2021/0192126 A1* | 6/2021 | Gehrmann | G06N 20/00 |
| 2021/0286951 A1* | 9/2021 | Song | G06N 3/0454 |

OTHER PUBLICATIONS

Yang et al., "Breaking the Beam Search Curse: A Study of (Re-)Scoring Methods and Stopping Criteria for Neural Machine Translation", 6 pages.

* cited by examiner

```
Algorithm1 Best-First Search
    procedure BEST-FIRST(src,M,K)
    ▷ Input sequence, model and beam size
        init ← [START]|src|[END]
        H.push((0,init))                          ▷ The priority queue
        A.reset()                                 ▷ The answer collection
        while(H is not Empty)and(A is not full) do
            current ← H.pop()
            if current ends with END then
                A.append(current)
                Continue
            Candidates.reset()
            for each w ∈ V do
                extended ← current⊕c
                S ← −logM(w|current⊕MASK)
                Candidates.append((S,extended))
            topK ← K-argmin (Candidates)
            H.pushAll(topK)
        return A
```

Figure 3

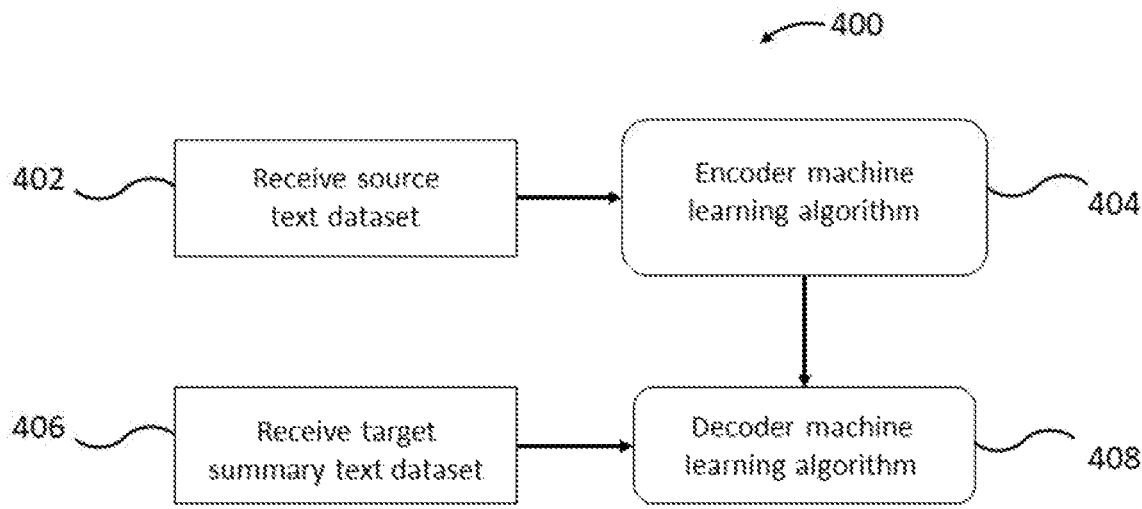

Figure 4

GENERATIVE TEXT SUMMARIZATION SYSTEM AND METHOD

TECHNICAL FIELD

The present disclosure relates to a generative text summarization system and method.

BACKGROUND

Text summarization strategies tend to employ machine learning algorithms that generate a concise summary of larger texts. For instance, text summarization may be used to generate a shorter paragraph summary for a longer news article or a text article that may be tens to hundred pages long. The machine learning employed needs to sift through redundant or inessential information and generate a summary that accurately conveys the meaning of the larger text.

SUMMARY

A system and method for a generative text summarization model is disclosed. The model may receive an input text dataset and enlarge a search space for one or more candidate words to be selected for inclusion in a text summary. The model may include and rank one or more of the candidate words within the search space using a best-first search algorithm. The model may also re-rank the one or more candidate words to be included in the text summary using a soft-bound word-reward (SBWR) algorithm. It is contemplated that the SBWR algorithm may apply a diminishing reward value to the one or more candidate words when the text summary exceeds a predicated length threshold. The SBWR algorithm may also apply an increased reward value to the one or more candidate words when the text summary is below the predicated length threshold. The SBWR algorithm may further select the one or more candidate words when the text summary is equivalent to the predicated length threshold.

The model may further smooth the diminishing reward value and the increased reward value using a sigmoid function. The diminishing reward value and the increased reward value may be scaled using a value that is trained to select the one or more candidate words to be included in the text summary. Also, the one or more candidate words may be re-ranked when the input text dataset exceeds a pre-defined length threshold.

A BP normalization may be calculated to apply a penalty to the one or more candidate words that do not meet the predicated length threshold. The BP normalization may be calculated by adding a logarithmic value of a brevity penalty with a length normalization scoring function. Also, the brevity penalty may be designed so that the generative text summarization model does not produce a short translation from the input text dataset. The brevity penalty may also include a copy rate value that reduces the brevity penalty toward zero.

The generative text summarization model may also be trained using a transformer neural model that includes an encoder machine learning algorithm and a decoder machine learning algorithm. During the training sequence, the input text dataset may be inputted to the encoder machine learning algorithm; and a target summary text dataset may be inputted to the decoder machine learning algorithm. The transformer neural model may also determine a probability value for one or more target summary tokens using one or more source tokens.

BRIEF DESCRIPTION OF THE DRAWINGS

FIG. 3 is an exemplary portion of source code for implementing the best-first search strategy.

FIG. 4 is an exemplary embodiment of a transformer neural model for training the generative text summarization neural model

DETAILED DESCRIPTION

Figure 1:
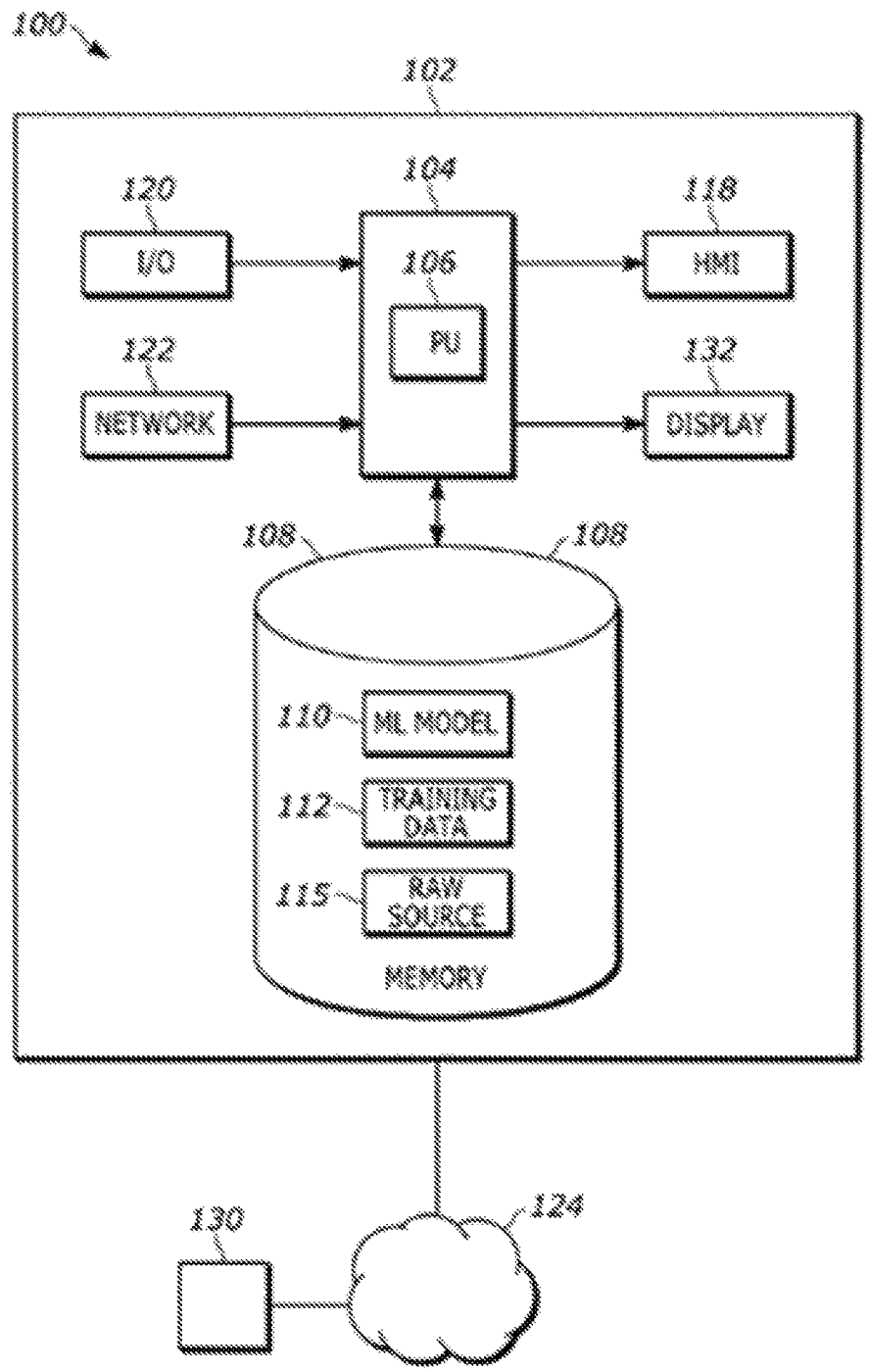
FIG. 1 is an exemplary system for employing a generative text summarization neural model.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Text summarization is generally the process of reducing a larger text (e.g., a long news article) to generate a summary that includes contextually accurate contents of an originally inputted textual dataset. To generate accurate summaries, various algorithms may attempt to account for length, writing style and syntax of the original text. Two known approaches for performing text summarization include extraction summarization and generative (i.e., abstraction) summarization. Extractive summarization typically operates by selecting and using sentences from an original text as part of the summary.

Alternatively, generative summarization may build an internal semantic representation and use natural language generation techniques to create an abstractive target summary from the original text. The generative summarization system may therefore create an abstractive target summary that is more accurate than extractive summarization. Also, generative summarization may create a summary that is more abstractive and expresses a meaning more closely resembling the original text.

It is contemplated that a transformer neural framework that employs a word embedding and an encoder-decoder structure may be used to improve the output summary of the generative summarization system. During the decoding phase, multiple summarization hypotheses may be generated as candidates for the system to select as the summarized output. If the searching strategy employs known "beam search" algorithms the possible output candidates may look like each other with just a slight variance on a given word. It is therefore also contemplated that a different strategy may be employed where the search space of the summarization candidates may first be enlarged.

For instance, a best-first search algorithm may be employed to enlarge the search space thereby generating candidates which are more diversified. Once diversified, a candidate summary may be selected having a different style or different emphasis on the information. A re-ranking approach may then be employed to select the best candidate as the output. The re-ranking approach may employ a soft-bounded word reward (SBWR) algorithm that selects the best candidate as the output for the summary.

FIG. 1 illustrates an exemplary system 100 that may be used to employ a generative text summarization neural model. The system 100 may include at least one computing devices 102. The computing system 102 may include at least one processor 104 that is operatively connected to a memory unit 108. The processor 104 may be one or more integrated circuits that implement the functionality of a processing unit (PU) 106. The PU 106 may be a commercially available central processing unit (CPU) that implements an instruction such as one of the x86, ARM, Power, or MIPS instruction set families. Or, the processing unit 106 may be a commercially available graphic processing unit (GPU) that is composed of hundreds of cores operable to handle numerous parallel tasks at the same time (i.e., parallel computing).

During operation, the PU 106 may execute stored program instructions that are retrieved from the memory unit 108. The stored program instructions may include software that controls operation of the PU 106 to perform the operation described herein. In some examples, the processor 104 may be a system on a chip (SoC) that integrates functionality of the PU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements the described features, it is intended that various features and functions may be separated and implemented by multiple computing units in communication with one another. The architecture selected may depend on a variety of factors.

The system 100 may implement a machine-learning algorithm 110 that is configured to analyze the raw source data 115 (or dataset). The raw source data 115 may include raw or unprocessed sensor data that may be representative of an input dataset for a machine-learning system. The raw source data 115 may include video, video segments, images, and raw or partially processed sensor data (e.g., data from digital camera or LiDAR sensor). In some examples, the machine-learning algorithm 110 may be a neural network algorithm (e.g., Transformer, CNN, RNN, or DNN) that may be designed to perform a predetermined function.

Figure 2:
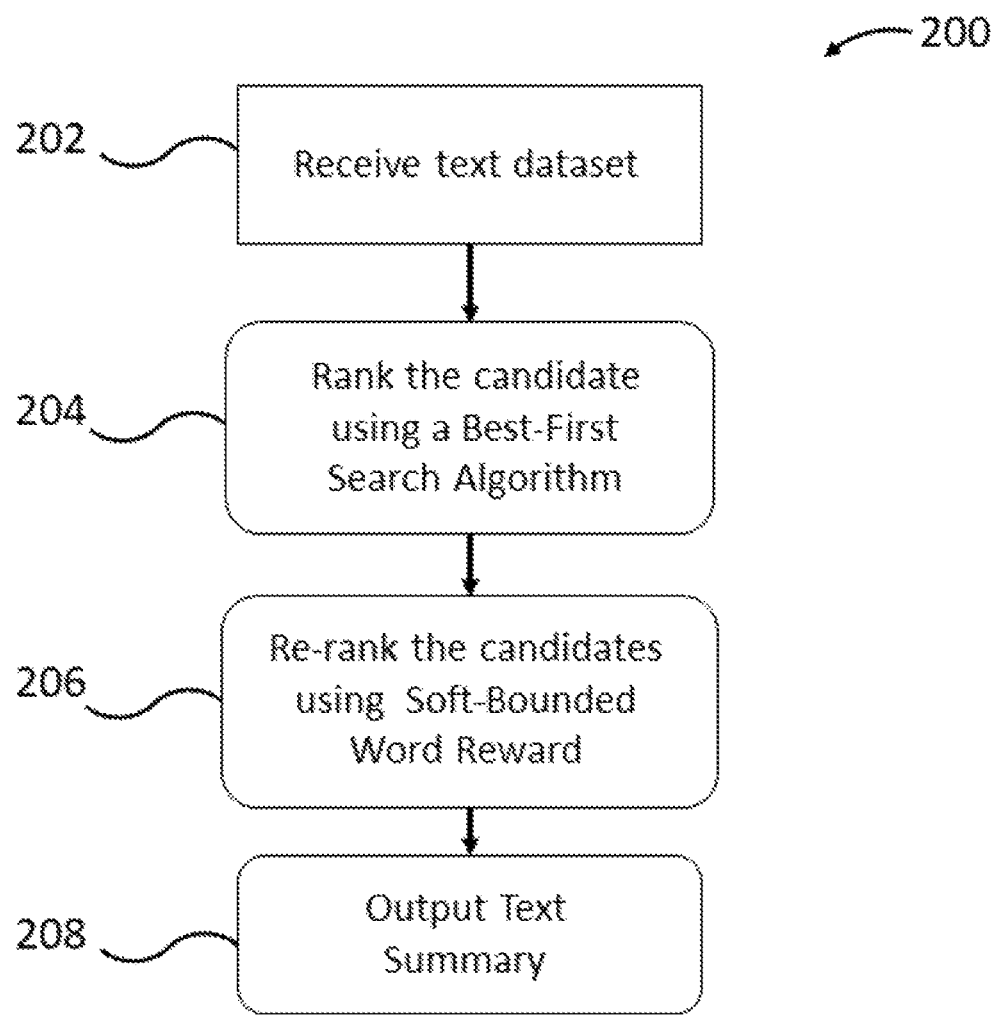
FIG. 2 is an exemplary flow diagram for employing the generative text summarization neural model.

FIG. 2 illustrates an exemplary flow diagram 200 for employing the generative text summarization neural model. Flow diagram 200 may begin at block 202 where a plain text dataset may be provided as an input to the generative summarization system. The dataset may be text that is provided from a keyboard or the text may be provided from one or more documents stored within the memory 118. The text may also be a webpage or document provided from the external network 124

The flow diagram may then proceed to block 204 where a decoding phase may be employed to determine the best output summary based on the inputted text dataset. It is contemplated that a "beam search" algorithm may be employed to determine a near optimal solution from the sequence labeling decoding process. Preferably, a best-first search strategy (e.g., a greedy best-first search or pure heuristic search) may be employed that favors a given candidate (i.e., possible selection) and a best score may then be assigned to the candidate.

FIG. 3 illustrates an exemplary portion of source code for implementing the best-first search strategy. As illustrated, the best-first search strategy may employ a priority heap that maintains partial summaries of the input text. The partial summaries may be scored according to a heuristic function. The best-first search algorithm may iteratively take the highest scoring partial summary and extend the partial summary by one word. The newly extended summary sequence may then be placed (i.e., pushed) back to the priority heap. The best-first search strategy may also generate top-k number of candidates for the new summary sequences. It is contemplated that the top-k may be generated by selecting words that generate the highest probability score (P) and iteratively appending the selected words to the partial summary (y). The highest probability may be generated using Equation 1 below:

$$\log P(y_j|y_{<j}, x) \quad \quad 5$$

Where a logarithmic value of the highest probability score (P) may append the selected words of the partial summary ($y_{<j}$) to the current partial summary ($y_j$) using a bitwise OR function based on the input text (x).

The flow diagram may then proceed to block 206 where a re-ranking process is employed to the summary candidates and the candidate generating the best result is selected. It is contemplated that a re-ranking process may still be necessary to rank the candidates beyond the best-first search process which enlarged the searching space to provide one or more diversified candidates.

For instance, one important aspect to consider during text summarization is the length of the input text data (e.g., length of input text sentence or string). The best-first search strategy will typically provide enhanced results (i.e., higher output scores) on shorter length candidates. But, short summaries can be too abstract and can lose key information from the original text. Indeed, in certain applications an overly short summary that only includes a few words may not be an informative summary even though the best-first search strategy may generate a high logarithmic score using Equation 1 above.

A length normalization may be employed that adjusts the term frequency or the relevance score to normalize the effect of text length on the document ranking. The length normalization may particularly be employed so that longer textual strings or statements are considered for reranking. It is generally understood that length normalization may provide better results than a beam search algorithm. A brevity-penalty (BP) normalization value ($\hat{S}_{bp}(x,y)$) may then be calculated to ensure the input text fits into the summarization task. The BP-norm value may also apply a penalty to summaries that do not meet a predefined expected length. The BP-norm algorithm may be calculated by adding the logarithmic value of the brevity penalty (log(bp)) with the length normalization scoring function $$\left(\frac{S(x,y)}{|y|}\right)$$

as shown in Equation 2 below:

$$\hat{S}_{bp}(x, y) = \log(bp) + \frac{S(x,y)}{|y|} \quad \text{[Equation 2]}$$

Where x is the input sequence that may be defined as $x=(x_1 \ldots, x_m)$ and y is the output hypothesis that may be defined as $y=(y_1 \ldots, y_m)$. It is contemplated that the brevity penalty (bp) that may be used for penalizing short translations may be calculated using Equation 3 below:

$$bp = \min\left(e^{1-\frac{1}{r}}, 1\right) \quad \text{[Equation 3]}$$

Where r is the copy rate that may include a percentage of summary tokens seen in the source text, scaled by a factor c. It is contemplated that when the copy rate r is set to 1, the penalty may reduce to value near or equal to 0. The penalty term may be further revised to make it prefer summaries with more copying from source text, as shown by Equations 4A and 4B below:

$$\exp(\hat{S}_{bp}(x, y)) = bp * \exp\left(\sum_{j=1}^{|y|} \log P(y_j|y_{<j}, x)^{\frac{1}{|y|}}\right) \quad \text{[Equation 4a]}$$

$$= bp * \left(\prod_{j=1}^{|y|} P(y_j|y_{<j}, x)\right)^{\frac{1}{|y|}} \quad \text{[Equation 4b]}$$

The calculated penalty term may directly translate to a coefficient multiplied to the log-likelihood score. Next, a Soft-Bound Word-Reward (SBWR) algorithm may be employed to re-rank the candidates as shown by Equation 5 below:

$$\hat{S}_{sbwr}(x, y) = S(x, y) + r \sum_{i=1}^{|y|} \sigma(\mathcal{L}_{pred} - i) \quad \text{[Equation 5]}$$

The SWBR algorithm may assign each word a reward in the summary. If the decoded) decoded summary length is greater than a predicated length threshold (i.e., i> $\mathcal{L}_{pred}$ ), the SWBR algorithm will apply a diminishing reward to the added words. The diminishing reward may be defined as $\sigma(\mathcal{L}_{pred} - i)$. When the decoded summary length is shorter than the expected threshold (i.e., i≤$\mathcal{L}_{pred}$ ), the SWBR algorithm will reward every word. It is contemplated that the SWBR algorithm may prefer the candidate closest to the predicated length ($\mathcal{L}_{pred}$). Also, a sigmoid function may be used to smooth the reward values and a coefficient (r) may be used to scale the total reward that is tuned on the validation data. The flow diagram may then proceed to block 208 where the output text summary is generated based on the words receiving the highest reward by the SWBR algorithm.

FIG. 4 illustrates an exemplary embodiment of a transformer neural model 400 that may be used for training the generative text summarization neural model. The transformer neural model 400 may include an encoder structure 404 and a decoder structure 408. To train the system, an input source text 402—which may include a sequence of tokens—may be input into the encoder module 404. Also, a target summary text 406—which may also include a sequence of text or text strings—may be inputted into the decoder structure 408. It is contemplated that the transformer neural model 400 may determine the probability of target summary tokens given a sequence of source tokens as shown by Equation 6 below:

$$P(y|x) = \prod_{j=1}^{|y|} P(y_j | y_{<j}, x) \quad \text{[Equation 6]}$$

Where y is the target summary tokens that may be defined as $y=\{y_1, y_2, \ldots, y_{|y|}\}$ and x is a sequence of source tokens that may be defined as $x=\{x1, x2, \ldots, x_{L_x}\}$.

FIG. 4 also illustrates that during the training phase, both the input (source) text 402 and target summary text 406 may be given as training instances to maximize the loss function or the maximum likelihood to observe a given set of training instances. In the decoding phase, given the parameters learned by the transformer neural model 400, the generative summarization system may determine output (y) using Equation 7 below:

$$y_{output} = \text{argmax}_y \prod_{j=1}^{|y|} P(y_j | y_{<j}, x) \quad \text{[Equation 7]}$$

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for a generative text summarization model, comprising:
    receiving an input text dataset;
    enlarging a search space for one or more candidate words to be selected for inclusion in a text summary, wherein the one or more candidate words included within the search space are ranked using a best-first search algorithm; and
    re-ranking the one or more candidate words to be included in the text summary using a soft-bound word-reward (SBWR) algorithm, wherein the SBWR algorithm applies a diminishing reward value to the one or more candidate words when the text summary exceeds a predicated length threshold, and wherein the SBWR algorithm applies an increased reward value to the one or more candidate words when the text summary is below the predicated length threshold.

2. The method of claim 1, wherein the SBWR algorithm selects the one or more candidate words when the text summary is equivalent to the predicated length threshold.

3. The method of claim 1, wherein the SBWR algorithm operates using the following formula:

$$\hat{S}_{sbwr}(x, y) = S(x, y) + r \sum_{i=1}^{|y|} \sigma(\mathcal{L}_{pred} - i).$$

4. The method of claim 1 further comprising: smoothing the diminishing reward value and the increased reward value using a sigmoid function.

5. The method of claim 1 further comprising: scaling the diminishing reward value and the increased reward value using a value that is trained to select the one or more candidate words to be included in the text summary.

6. The method of claim 1, re-ranking the one or more candidate words when the input text dataset exceeds a predefined length threshold.

7. The method of claim 1 further comprising: calculating a BP normalization that applies a penalty to the one or more candidate words that do not meet the predicated length threshold.

8. The method of claim 7, wherein the BP normalization is calculated by adding a logarithmic value of a brevity penalty with a length normalization scoring function.

9. The method of claim 8, wherein the brevity penalty is designed so that the generative text summarization model does not produce a short translation from the input text dataset.

10. The method of claim 8, wherein the brevity penalty includes a copy rate value that reduces the brevity penalty toward zero.

11. The method of claim 1 further comprising: training the generative text summarization model using a transformer neural model.

12. The method of claim 11, wherein the transformer neural model includes an encoder machine learning algorithm and a decoder machine learning algorithm.

13. The method of claim 12 further comprising: inputting the input text dataset to the encoder machine learning algorithm; and inputting a target summary text dataset to the decoder machine learning algorithm.

14. The method of claim 13, wherein the transformer neural model determines a probability value for one or more target summary tokens using one or more source tokens.

15. The method of claim 14, wherein the transformer neural model determines the probability value for the one or more target summary tokens using the one or more source tokens based on the following equation:

$$P(y|x) = \prod_{j=1}^{|y|} P(y_j | y_{<j}, x).$$

16. A system operable to employ a generative text summarization model, comprising:

a memory operable to store an input text dataset;

a processor operable to:

enlarge a search space for one or more candidate words to be selected for inclusion in a text summary, wherein the one or more candidate words included within the search space are ranked using a best-first search algorithm; and re-rank the one or more candidate words to be included in the text summary using a soft-bound word-reward (SBWR) algorithm, wherein the SBWR algorithm applies a diminishing reward value to the one or more candidate words when the text summary exceeds a predicated length threshold, and wherein the SBWR algorithm applies an increased reward value to the one or more candidate words when the text summary is below the predicated length threshold.

17. The system of claim 16, wherein the SBWR algorithm selects the one or more candidate words when the text summary is equivalent to the predicated length threshold.

18. The system of claim 16, wherein the processor is further operable to: smooth the diminishing reward value and the increased reward value using a sigmoid function.

19. The system of claim 16, wherein the processor is further operable to: scale the diminishing reward value and the increased reward value using a weighting value that is trained to select the one or more candidate words to be included in the text summary.

20. A non-transitory computer-readable medium operable to employ a generative text summarization model, the non-transitory computer-readable medium having computer-readable instructions stored thereon that are operable to be executed to perform the following functions:

receiving an input text dataset;

enlarging a search space for one or more candidate words to be selected for inclusion in a text summary, wherein the one or more candidate words included within the search space are ranked using a best-first search algorithm; and re-ranking the one or more candidate words to be included in the text summary using a soft-bound word-reward (SBWR) algorithm, wherein the SBWR algorithm applies a diminishing reward value to the one or more candidate words when the text summary exceeds a predicated length threshold, and wherein the SBWR algorithm applies an increased reward value to the one or more candidate words when the text summary is below the predicated length threshold.

* * * * *